March 23, 1943.  B. MAGGIN  2,314,722
RECORDING BAROGRAPH
Filed Oct. 20, 1941  2 Sheets-Sheet 1
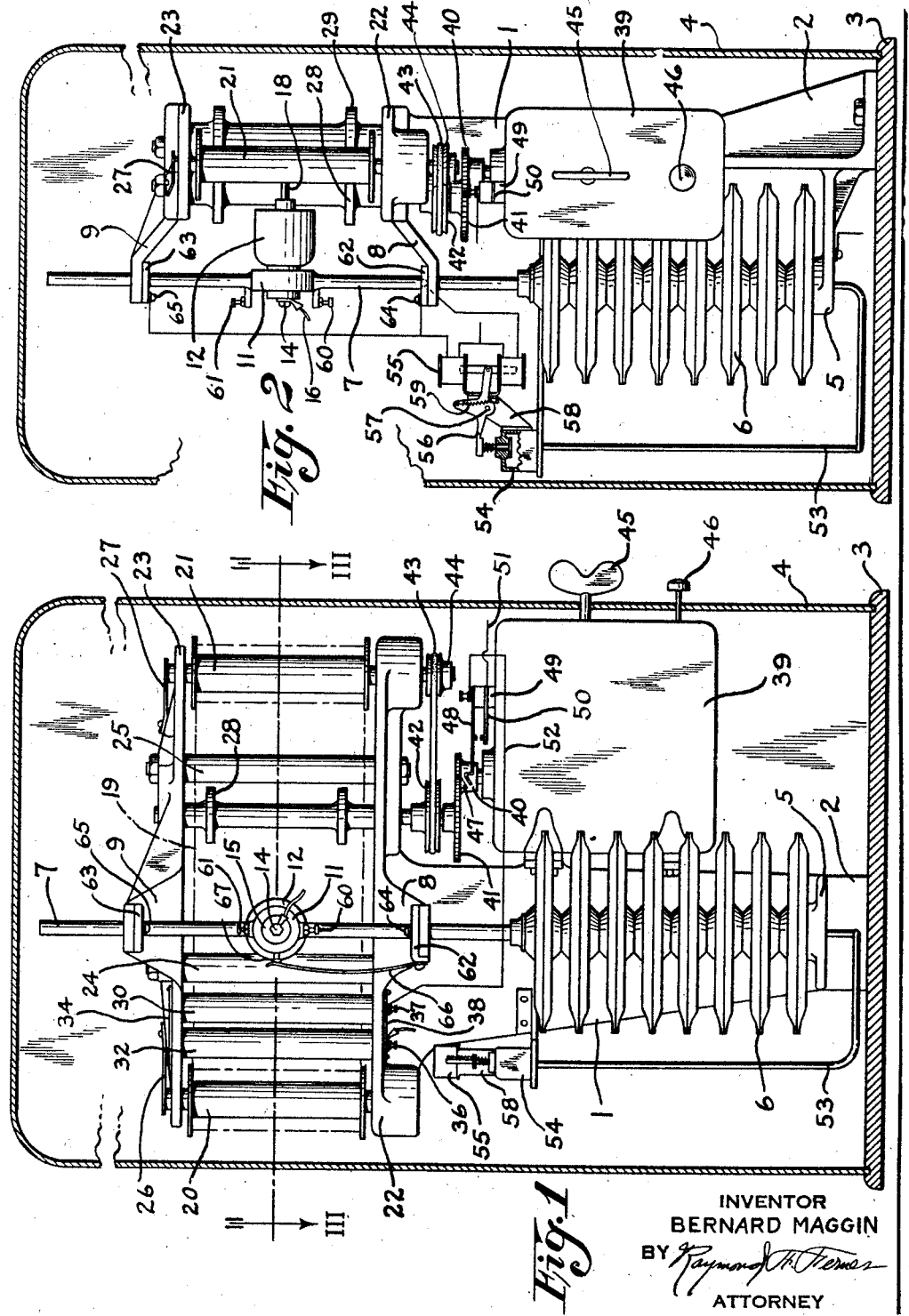
INVENTOR
BERNARD MAGGIN
BY
ATTORNEY March 23, 1943.   B. MAGGIN   2,314,722
RECORDING BAROGRAPH
Filed Oct. 20, 1941   2 Sheets-Sheet 2
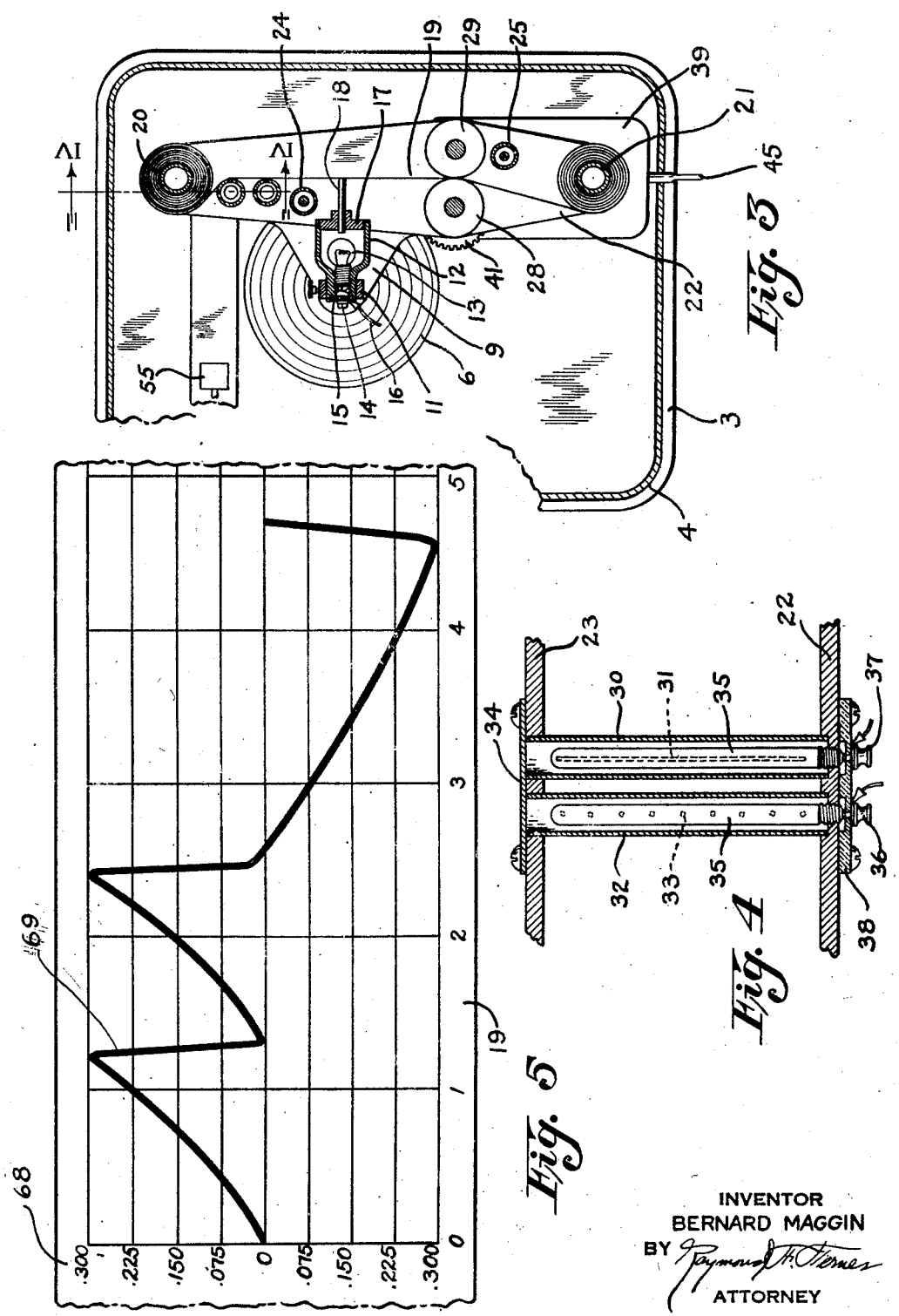
INVENTOR
BERNARD MAGGIN
BY
ATTORNEY Patented Mar. 23, 1943

2,314,722

UNITED STATES PATENT OFFICE 2,314,722

RECORDING BAROGRAPH

Bernard Maggin, Detroit, Mich.

Application October 20, 1941, Serial No. 415,777

1 Claim. (Cl. 234—17)

This invention relates to aircraft instruments, and in particular it relates to an aircraft recording instrument capable of recording the rate of ascent or descent.

For aircraft purposes it is highly desirable to obtain permanent records of the performance properties of airplanes. These records serve to provide a basic set of curves from which various performance characteristics of the aeroplane may be calculated. Such an instrument is of particular importance as test equipment in the determination of the characteristics of newly designed aeroplanes.

General characteristics of a new plane can be predicted by the aeronautical engineer through the use of empirical formulas or mathematically evolved equations. Nevertheless, it remains for the flight test engineer to collect the exact data under actual flight conditions. The present invention provides means for assisting the flight test engineer in the determination of flight performance characteristics such as maximum rate of climb, minimum rate of descent, maximum angle of climb, or various combinations thereof.

In accordance with the practice of my invention I provide an air craft instrument in the form of a recording step barograph. One of the principal difficulties with devices for recording the rate of ascent is the cumbersome mechanism required in order to trace the great heights which air planes are capable of ascending. I have found that by tracing the rate of ascent or descent curve through the medium of a "Sylphon" capsule type pressure recording device incorporating means for releasing the capsule pressure at predetermined intervals a step traced curve can be recorded on a relatively narrow strip of recording paper. By this arrangement the rate of ascent or descent covering wide ranges may be conveniently recorded. These traced curves provide the basis for calculating the principal performance characteristics of aeroplanes in a convenient and accurate manner.

It is, therefore, among the objects of my invention to provide an air craft instrument which will accurately and conveniently record the rate of ascent or descent throughout a wide range of elevation; to provide an instrument which when once set in motion will operate continuously and automatically throughout the desired recording period; and, to provide such an instrument which is readily portable and which may be manufactured economically and efficiently. These and other objects and advantages will appear more fully in the following detailed description when considered in connection with the accompanying drawings, in which:

Figure 1 is a side elevational view, partly in section, of an embodiment of my invention;

Figure 2 is an end elevational view thereof, partly in section;

Figure 3 is a plan view, in section, of the air craft instrument taken along lines III—III of Figure 1;

Figure 4 is an enlarged view, in section, illustrating light means for forming lines on light sensitive paper, the view being taken along lines IV—IV of Fig. 3; and, Fig. 5 is an enlarged view illustrating a portion of a chart and showing exemplary curves traced thereon.

Referring to the drawings, and in particular to Figures 1 and 2, I show an embodiment of my invention in which various elements of the air craft instrument are attached to a main frame 1 supported by a bracket 2 which in turn is secured to a base member 3. A cover 4 adapted to fit in complementary relation with the base member 3 serves as an enclosure for the entire device.

An arm 5 extending laterally from the frame 1 forms a rigid support which connects with a plurality of "Sylphon" capsules 6 joined together axially and adapted for movement in a vertical planes. Attached to the "Sylphon" capsule position remotely from the support 5 is a rod 7 slidable in supports 8 and 9 extending laterally from the frame 1. Differential atmospheric pressures react upon the "Sylphon" capsules 6 to cause the rod 7 to move axially in a vertical direction.

Associated with the rod 7 and interposed between the arms 8 and 9 is a lighting device which functions to transmit a pointed beam of light on a photographically sensitive recording chart hereinafter described. This lighting device, as shown particularly in Figure 3, comprises a ring 11 forming a part of the rod 7. A cup-shaped member 12 is adapted to be retained by the ring 11 at the base portion of the cup member. A small electric light bulb 13 is threaded to the base of the cup member, and the cup member itself serves as a grounded contact to form one electrical terminal. A second electric terminal 14 supported by an insulated panel 15 serves as the other means for supplying current to the electric light bulb 13. A wire 16 connects the terminal 14 to a source of current such as an electric battery, not shown. It is intended that the light bulb 13 remains lit throughout the operation of the instrument.

A flange 17 forms an inclosure for the open end of the cup-shaped member 12, and a rod 18 of transparent light conducting plastic such as "Lucite" forms a means of transmitting and localizing a pencil-like beam of light. Preferably the outer surface of the plastic rod 18 is coated with a black paint or other covering so as to limit the transmission of light except at the ends of the rod 18. By this arrangement the lighting device is completely enclosed with the exception of the outer end of the rod 18.

The tip of the rod 18 lies in close proximity to a strip of photograph paper 19 having its surface coated with a light sensitive emulsion. This strip of photograph paper is supported by reels 20 and 21, which, in turn, are mounted on a plate 22, forming an extension of the main frame 1, and a complementary plate 23 spaced from the plate 22 by means of spacer rods 24 and 25. Flat spring members 26 and 27 provide means for retaining the reels 20 and 21, respectively, in proper position while at the same time permitting the removal of the reels. A pair of drive rollers 28 and 29 mounted on the frame plates 22 and 23 have their rim surfaces formed on a resilient material, such as rubber, which engages under tension with the photograph paper 19 to cause a positive drive movement of the strip of paper 19.

Vertical and horizontal lines are imprinted on the sensitized paper by means of light sources directed against the paper. The vertical light source comprises a sleeve 30 (Fig. 4) retained by the upper and lower plates 23 and 22. A vertical slot 31 extends the length of the sleeve 30, and this position of the sleeve lies in close proximity to the sensitized paper 19. A similar sleeve 32 next to the sleeve 30 is provided with a plurality of spaced apertures 33 which lie adjacent to the sensitized paper 19. A cover 34 secures the sleeves in place and permits the sleeve 32 to be replaced by a sleeve with different aperture spacing to correspond to pressures at different elevations. Each sleeve is provided with an elongated electric light bulb 35 which screws into the base plate 22. The plate 22 is grounded to one potential of an electrical circuit. The other potential forms contacts 36 and 37 communicating with the lamps 35 through an insulated spacer 38 attached to the plate 22. The lamp in sleeve 32 remains lighted throughout the operation of the instrument. The lamp in sleeve 30 flashes at predetermined intervals, by means hereinafter described, to impress vertically exposed lines on the sensitized paper 19.

A clock works unit 39 is attached to the main frame 1 and serves to rotate the drive roller 28 through a pair of gears 40 and 41. A drive is also provided, for the wind-up reel 21, which comprises a pulley 42 attached to the drive roller 28 and communicating to the reel 21 by means of a belt 43 and pulley 44. The ratio of the pulley drive is such that the reel 21 will rotate slightly faster than the drive rollers 28 and 29. The belt 43 is sufficiently loose to permit slippage so that the drive rollers 28 and 29 provide the principal driving force. A hand key 45 extends from the cover 4 to permit manual winding of the clock works 39, and a start and stop control 46 completes the clock unit.

Means are provided on top of the clock unit 39 for flashing the lamp 35 in the sleeve 30 at proper intervals. This means comprises a cam 47 attached to the gear 40 and adapted for engagement with a spring arm 48 mounted on insulator spacers 49 attached to the top of the clock unit 39. A second spring arm 50 supported by the insulated spacers 49 extends in close proximity to the spring arm 48. Both arms are provided with contact points which engage to complete a circuit to the lamp in sleeve 30 when the cam 47 depresses the arm 48. Line 51 leads to a battery source and line 52 joins the lamp circuit with circuit breaking arm 48.

Instead of operating at a constant pressure the "Sylphon" capsules 6 are arranged so that the internal pressure of the capsules may be periodically neutralized to the normal prevailing atmospheric pressure. This is accomplished by connecting the "Sylphon" capsules with a conduit 53 leading to a conventional valve mechanism 54 supported by the main frame 1. Actuation of the valve is produced by a solenoid 55 which engages a lever 56 pivotally mounted at 57 to a bracket 58 extending from the valve housing 54. A spring 59 connecting with an extension of the lever 56 and connecting with the bracket 58 provides an off-center tensioning means for maintaining the valve in an open or closed position, unless otherwise changed by movement of the solenoid 55.

Electrical connections are provided for operating the solenoid 55. This is illustrated diagrammatically in Figure 2. A pair of adjustable electrical contact points 60 and 61 are located adjacent the ring member 11 axially of the path of movement of the rod 7. These contacts are grounded terminals. Attached to the arms 8 and 9 are insulated blocks 62 and 63, respectively, which support contacts points 64 and 65, respectively. The contact points 64 and 65 are in alignment with and adapted to engage with the contact terminals 60 and 61, respectively. Also attached to the insulated block 62 is a flat spring contact member 66 adapted to engage with a contact point 67 projecting from the side of the ring member 11. The operations of the results obtained by these various contacts will be described hereinafter.

In Figure 5 an example of a graph type chart in the form of a roll of photographically sensitive paper is shown. The vertical column 68 represents atmospheric pressures of from zero to .30 lb. pressure per square foot beginning at the center of the strip of paper and extending both upwards and downwards. The lower horizontal column represents the time interval in minutes. The mechanism as herein described functions to move the photograph paper at a speed commensurate with the time readings impressed on the photograph paper.

In the operation of the device the recording step barograph traces a curve such as 69 on the paper. The neutral position of the step barograph is at zero representing the horizontal central line on the photograph paper. In this position the valve 54 is closed and as the plane in which the barograph is used begins to ascend, the change in atmospheric pressure reacts upon the "sylphon" capsules 6 to begin tracing a curve representing the vertical ascent of the plane. As the plane ascends to the maximum upper limit of the device, the contact point 61 engages the contact point 65 causing an electrical connection which operates the solenoid 55 to open the valve 54. This allows the interior of the "Sylphon" capsules to become open to the prevailing atmospheric pressure and causes the capsules to recede to the normal central position at which point the contact terminal 67 engages the spring contact 66 causing the valve 54 to close. Thereafter, the rate of ascent is again traced without any substantial blank interval. By this arrangement the rate of ascent may be traced to any desired height by a convenient and accurate method. In a substantially similar method the rate of descent may be traced on the graph. For example, when a plane is at a high altitude and begins to descend or power dive, the lower portion of the graph is used on which may be traced the rate of descent by the step barograph method in the same manner as the rate of ascent is traced. While the chart is graduated in pressures, it may be converted into altitude when the graph is read. The curves as thus traced provide an accurate means which serves as the basis for calculating performance characteristics of aeroplanes to an exceptionally accurate degree.

As thus shown and described, it is believed apparent that I have provided a novel and useful device in the form of an invaluable instrument for revealing accurate characteristics of aeroplane performance, and while I have shown a preferred embodiment of my invention it is to be understood that it is susceptible to those modifications which appear obvious and which appear within the spirit of the invention and the scope of the appended claim.

Having thus described my invention what I claim and desire to protect by Letters Patent is:

A recording device of the character described comprising a plurality of capsules forming a single bellows axially supported at one end, a support extending from the opposite end, means supporting a recording chart strip movable transversely of the axis of the bellows, means normally positioned midway between the width of the chart strip for describing a path over the chart, means actuated by movement of the bellows for opening the interior of the bellows to the atmosphere at a predetermined position along the stroke of the support at each side of its normal central position, and means for closing the interior of the bellows to the atmosphere at the normal central position of the support.

BERNARD MAGGIN.